Nov. 22, 1960 G. V. COPLAND ET AL 2,960,861
FLUID DENSITY AND VISCOSITY METER SYSTEM
Filed Sept. 5, 1958 2 Sheets-Sheet 1

George V. Copland
Robert G. Love
Forrest C. Pittman
INVENTORS

BY
*Earl L. Barr*
ATTORNEY

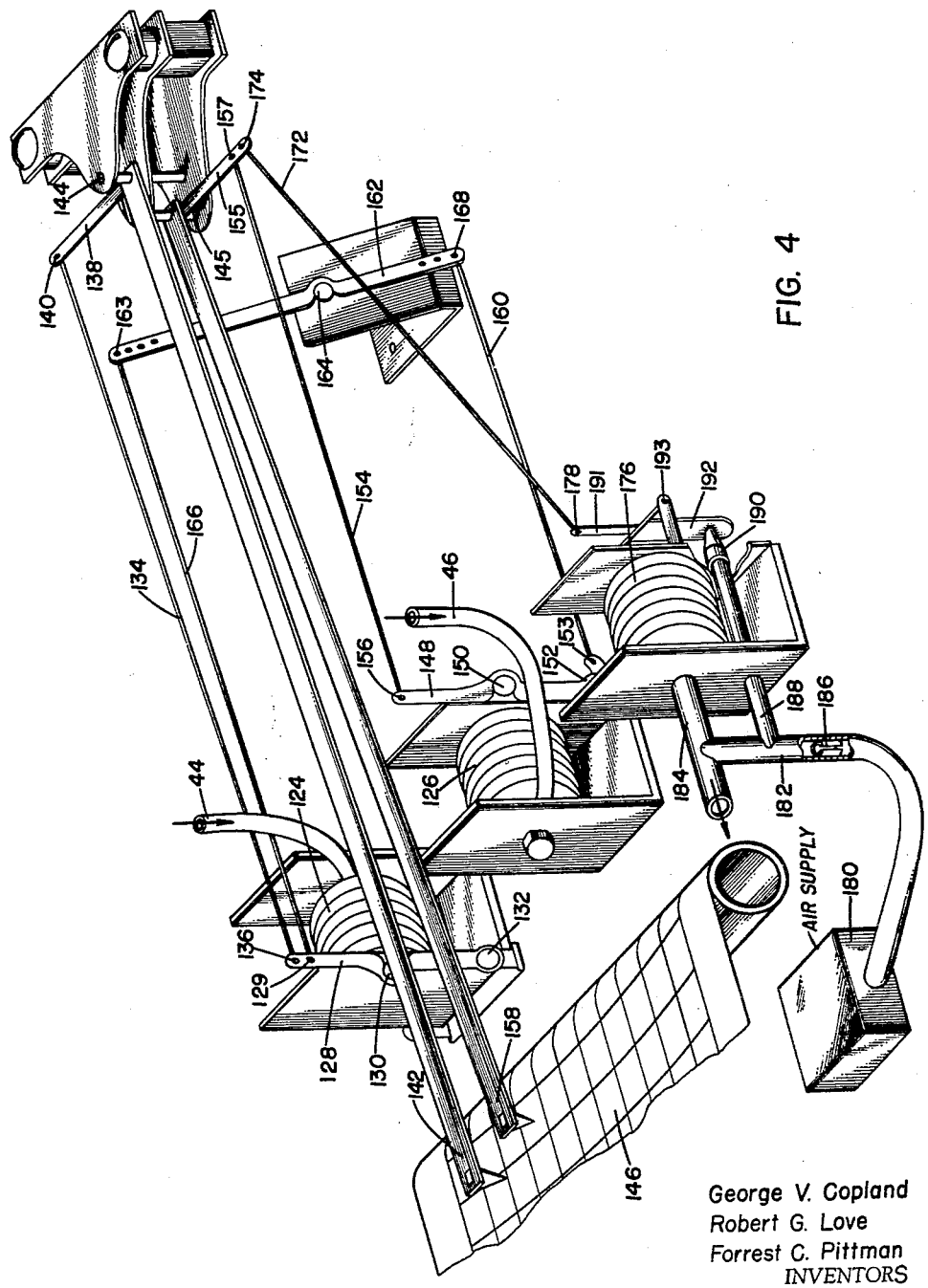

2,960,861

FLUID DENSITY AND VISCOSITY METER SYSTEM

George V. Copland, Robert G. Love, and Forrest C. Pittman, Duncan, Okla., assignors to Halliburton Oil Well Cementing Company, Duncan, Okla.

Filed Sept. 5, 1958, Ser. No. 759,230

2 Claims. (Cl. 73—55)

This invention relates to a device which translates the density and the viscosity characteristics of a flowing fluid into Marsh Funnel readings. Such readings are peculiar to the oil well drilling industry and are an indication of the apparent viscosity of a drilling fluid. The Marsh Funnel is described in API, RP 29, third edition, May 1950. Since a drilling fluid is a non-Newton fluid, it does not possess true viscosity characteristics. In using the Marsh Funnel readings, an indication of the resistance to flow of the fluid in a conduit is obtained, and such readings are relied on in determining whether the fluid has the desired flow properties for any particular condition. More specifically, the Marsh Funnel reading of a fluid is dependent on its viscosity characteristic as modified by its density. The procedure outlined in the above API Code 29 is intermittent, cumbersome, and time consuming. It does not permit a continuous and accurate determination of the flow properties of the fluid.

Applicants' invention provides a device which continuously and accurately records and indicates the Marsh Funnel reading of a flowing fluid and, if desired, simultaneously the density of it. This device incorporates the features of the copending application, Serial No. 712,824, filed February 3, 1958, in the name of George V. Copland and entitled "Fluid Density Meter" now abandoned.

It is an object of this invention to provide an apparatus which continuously and accurately records the Marsh Funnel readings of a flowing fluid.

It is a further object of the invention to provide for a remote location of a gauge which indicates the Marsh Funnel readings.

These and other objects of the invention will become apparent from the following description and accompanying drawings, in which:

Figure 4 is a schematic and isometric view of the translation and recording elements of the system illustrated in Figure 1.

Figure 1:
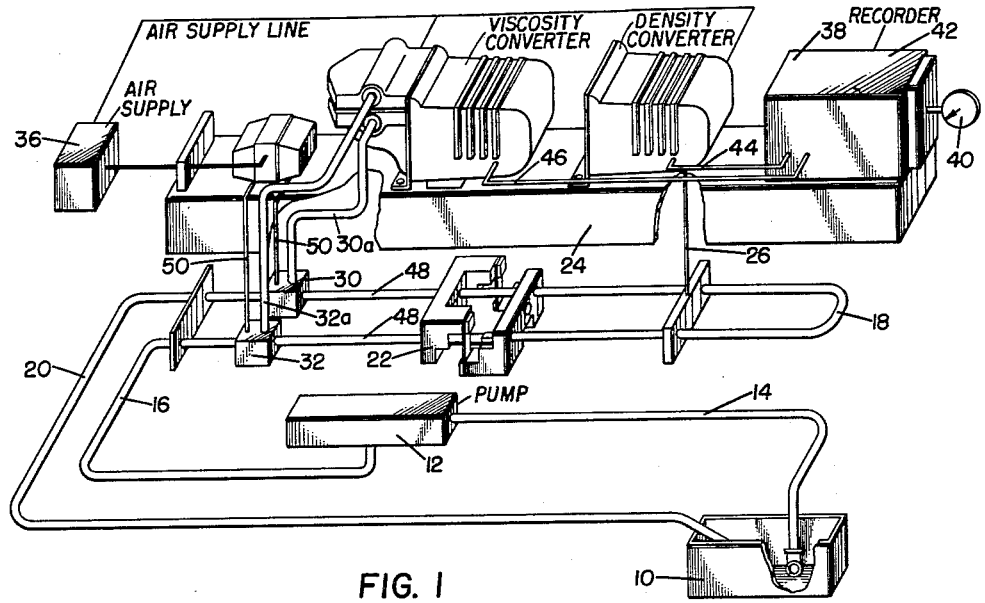
Figure 1 is a schematic and isometric view of an arrangement embodying the invention.

The relationship of the various components of the invention are illustrated in Figure 1. The fluid of which the Marsh Funnel and density readings are to be determined and recorded is placed in a suitable container 10. The container 10 could be such well-known oil drilling industry items as a mud pit or a cement slurry tub. The fluid is removed from the container 10 and forced into a circuit conduit system by means of a constant velocity pump 12. The pump 12 is driven at a constant speed by any suitable means (not shown). The circuit conduit system consists of several connecting members, such as a conduit 14 from the container 10 to the pump 12, a conduit 16 from the pump 12 to a density loop 18, and a return conduit 20 from the density loop 18 to the container 10. A pivot system 22 connects the conduits 16 and 20 to the density loop 18 and also supports the loop 18 in a housing 24.

In accordance with the present invention, two converters are provided, one of which modulates the air pressure in a chamber in accordance with the density of the fluid in the circuit conduit system, and the other of which modulates the air pressure in another chamber in accordance with the apparent viscosity of the fluid in the circuit conduit system.

A coupling link 26 is provided to translate forces exerted on the loop 18 by the weight of a fluid therein to a density converter 28. A pressure tap 30 is provided in the conduit 20 and a pressure tap 32 is provided in the conduit 16. Pressure taps 30 and 32 are connected to a viscosity converter 34 by pressure conduits 30a and 32a. An air supply 36 is connected for operation of converters 34 and 28 and pressure taps 30 and 32. A mechanism 38 is provided which translates the viscosity determination of the converter 34 and the density determination of converter 28 into Marsh Funnel readings which are indicated on a gauge 40 and recorded on a recorder 42. This mechanism 38 serves to combine and balance the air signals from the converters 28 and 34. A conduit 44 connects the density converter 28 to the mechanism 38 and a conduit 46 connects the viscosity converter 34 to the mechanism 38.

A detailed description of the elements 10, 12, 14, 16, 18, 22, 26, 28 and 36 are to be found in the copending application, Serial No. 712,824.

Figure 3:
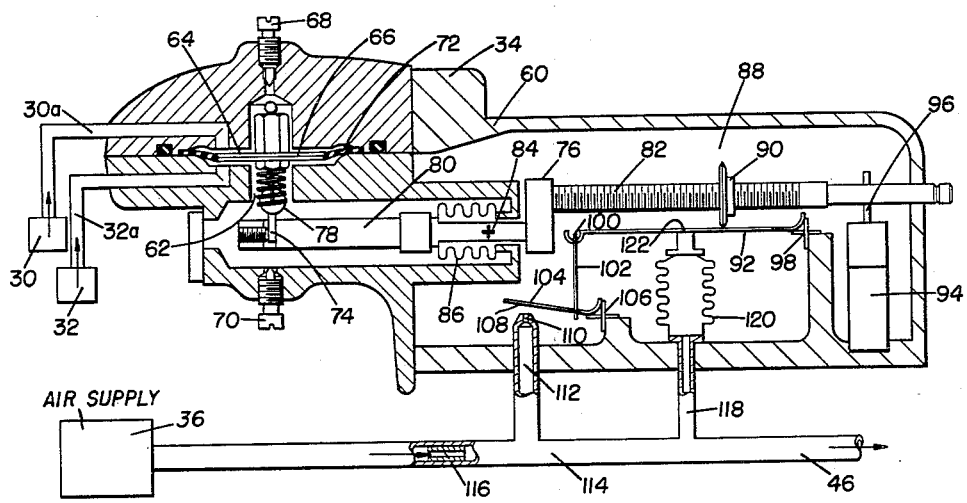
Figure 3 is a detailed view in elevation of the component parts of a viscosity converter employed in the system illustrated in Figure 1.
Figure 2:
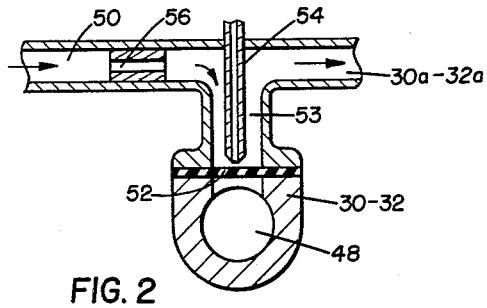
Figure 2 is a sectional view of the pressure taps employed in the viscosity measuring system illustrated in Figure 1.

The component parts of the viscosity measuring system employed in the invention are shown in Figures 2 and 3 of the drawing. As shown in Figure 2, the pressure taps 30—32 consist of a fluid conduit 48, an air supply conduit 50, and an air outlet conduit 30a—32a. The conduits 30a and 32a are connected to the viscosity converter 34. A diaphragm 52 separates the conduit 48 from the conduits 50 and 30a—32a. A nozzle 54 is provided and, in cooperation with the diaphragm 52, serves as an intermittent outlet valve for the air. A restrictive orifice 56 is placed in the air supply conduit 50.

As shown in Figure 3, the converter 34 is employed in conjunction with an air supply system 36. The converter 34 translates the pressure drop between the taps 30 and 32 into an air signal.

The converter 34 is of the differential type and employs the null balance principle by operation of a pneumatic transmission system.

As shown in Figure 3, the converter 34 has a housing 60 in which are located the coacting elements. A chamber 62 is provided to receive the air signal from the pressure tap 32. A chamber 64 is provided to receive the air signal from the pressure tap 30. The chambers 62 and 64 are separated by a diaphragm 66 and are provided with air bleed off valves 68 and 70. The edge 72 of the diaphragm 66 is of resilient material and is firmly secured in the housing 60 as shown. The diaphragm 66 is connected to one end 74 of a primary beam assembly 76 by a suitable linkage 78. The primary beam assembly 76 consists principally of two integral sections 80 and 82, and is mounted by a pivot 84 in the housing 60. The section 80 is located in the chamber 62. Air in the chamber 62 is prevented from leaking out past the section 80 by a suitable seal 86. The seal 86 needs to be of a type that will permit movement of the beam assembly 76 about the pivot 84, and, therefore, is shown as a bellows type. The second section 82 of the beam assembly 76 is located in a chamber 88 of the housing 60. An adjusting nut 90 is mounted about the section 82 and contacts a secondary beam 92. A conventional dash pot assembly 94 is attached to the section 82 at 96.

The secondary beam 92 is mounted in the chamber 88 by a pivot 98 at one end thereof. The other end 100 is connected by a linkage 102 to a flapper valve 104. The flapper valve 104 is mounted in the chamber 88 by a pivot 106 at one end thereof. The other end 108 of the flapper valve 104 is adapted to cover and uncover a nozzle 110 in a conduit 112. In the normal position the nozzle 110 is uncovered by the end 108 of the flapper valve 104. The conduit 112 is connected to a conduit 114, which is connected to the air supply 36 and the mechanism 38 to the recorder 42 by the conduit 46. Between the air supply 58 and the conduit 114 a restriction or orifice 116 is located. The opening of the nozzle 110 is larger in diameter than the restriction 116.

A conduit 118 is connected to the conduit 114 downstream from the conduit 112. The conduit 118 is connected to a bellows 120 which is connected to the secondary beam 92 at 122.

The component parts of the indicator and recorder mechanism 38 are shown in Figure 4 of the drawing. The conduit 44 is shown connected to a density bellows 124 and the conduit 46 is connected to a viscosity bellows 126. An arm 128 is connected to the bellows 124 by a pin 130. One end of the arm 128 is pivoted at 132. A linkage rod 134 is attached to the arm 128 at 136. The other end of the rod 134 is connected to an arm 138 at 140. The arm 138 actuates a density pen 142 through a pivot 144. The density pen 142 is adapted to apply density readings to a chart 146.

An arm 148 is connected to the bellows 126 by a pin 150. One end of the arm 148 is pivoted at 152 and the other end is connected to a linkage rod 154 at 156. The other end of the linkage rod 154 is connected to an arm 155 at 157. The arm 155 actuates a Marsh Funnel pen 158 through a pivot 145. A linkage rod 160 connects the arm 148 at 153 to a balance beam or ratio arm 162 at 168. The ratio arm 162 pivots about a pin 164 and is connected to a linkage rod 166 at 163. The linkage rod 166 is connected to the arm 128 at 129.

Figure 4 further illustrates an apparatus which is suitable for transmitting the Marsh Funnel reading as recorded by the pen 158 to a remote location. A linkage 172 is connected to the Marsh Funnel pen 158 system at 174. The linkage rod 172 is connected to a flapper arm 191 at 178. The flapper arm 191 is connected to a bellows 176 through a pivot 193. The bellows 176 is connected to an independent air supply 180 by conduits 182 and 184. Conduit 182 has a restriction 186 and is connected to a conduit 188. At the end of the conduit 188 is a nozzle 190. A flapper 192 connected to the flapper arm 191 covers and uncovers the nozzle 190 as the linkage rod 172 is actuated by the Marsh Funnel pen system. The conduit 184 is also connected to a remote gauge (not shown) upon which continuous Marsh Funnel readings are indicated.

In the operation of the apparatus of this invention, an air pressure signal is put out from the density converter 28. Such signal is transmitted by the conduit 44 to the mechanism 38 and represents the density of the fluid in the loop 18. The air pressure signal is obtained in the manner as is described in the copending application, Serial No. 712,824.

An air pressure signal is also put out from the viscosity converter 34 and such signal is transmitted to the mechanism 38 by the conduit 46. Such air pressure signal represents the viscosity of the fluid in the conduits 16, 18, and 20 and is obtained in the following manner.

The fluid moving through the conduits 16, 18, 20 and 48 at a constant velocity causes a pressure to be exerted on the diaphragm 52 in the viscosity pick-up taps 30 and 32. (See Figure 2.) Air from the supply conduit 50 enters the cavity 53 through the restriction 56. The restriction 56 is relatively smaller than the nozzle 54. The fluid pressure in the conduit 48 causes the resilient diaphragm 52 to expand upward, thereby restricting the bypassing of air in the cavity 53 through the nozzle 54 to the atmosphere. With the air still entering the cavity 53 through the restriction 56, the pressure in the cavity 53 builds up until it reaches the same pressure as the fluid in the conduit 48. At this point the diaphragm 52 is in a state of equilibrium, balanced by the air pressure on the top and the fluid pressure on the bottom. The air pressure, still entering the cavity 53 through the restriction 56, is at a higher pressure than the fluid in the conduit 48. This causes the pressure in the cavity 53 to build up slightly greater than the fluid pressure in the conduit 48 and results in a slight movement of the diaphragm 52 downward. This in turn opens the orifice 54 and allows the excess pressure to bypass to the atmosphere. After the balance condition is achieved, the back pressure entrained in the cavity 53 is the same as the fluid pressure at that point in the conduit 48, and such pressure is transmitted through conduit 30a and 32a to the viscosity converter 34.

The pressure loss of the fluid passing through the conduits 48, 18, and 48 at a constant velocity reflects an index of viscosity, which is represented by a difference in the pressures at the taps 30 and 32. This pressure difference is obtained by transmitting the signal obtained by pressure taps 30 and 32 through conduit 30a and 32a to the cavities 64 and 62, respectively, in the viscosity converter 34. (See Figure 3.) The net result of the two opposing pressures in the viscosity converter is an upward force of the diaphragm 66 which is proportional to the difference in pressures from the taps 30 and 32. This force is transmitted to the primary beam 82 through the connecting pin 74. The upward motion of the diaphragm 66 causes the beam 82 to pivot clockwise about pivot point 84 and causes a downward force to be exerted on the secondary beam 92 through the adjusting nut 90. The secondary beam 92 pivots about point 98 and the downward forces of the adjusting nut 90 cause a downward force to be exerted on the flapper 104 through the linkage 102, thereby closing the orifice in the nozzle 110.

Air entering the conduit 114 through the restriction 116 and from the air supply 36 is blocked from leaving the system through the nozzle 110 and is forced to build up in the conduit 114 and moves to the feed-back bellows 120 through the conduit 118. Air continues to enter system through the restriction 116, and the increased pressure causes the feed-back bellows 120 to expand and exert an opposite force on the secondary beam 92. When this force equals that of the applied force of the viscosity signal to the primary beam 82, the flapper 108 is raised up off the nozzle 110 and the excess air pressure in the conduit 114 is allowed to escape to the atmosphere. A null balance is thus obtained, and the entrained air pressure in the conduit 114 is proportional to the differences in air pressures of the taps 30 and 32, which is an indication of the viscosity of the sampled fluid.

It is the function of the mechanism 38 to record the density of the fluid independently of its viscosity and at the same time to record the Marsh Funnel reading. These are accomplished in the following manner:

The air pressure signal enters the bellows 124 from the conduit 44. The bellows 124 expands and by a connection at 130 moves the arm 128 to the left as it moves about the pivot 132. The movement of the arm 128 at 136 is transmitted to the density pen 142 and the chart 146 by the linkage system of the rod 134, the pin 140, the arm 138, and the pivot 144. Such movement of the arm 128 is calibrated by means of the linkage system so that the density pen 142 records the density of fluid on the chart 146.

The viscosity system is operating simultaneously with the density system. Therefore, the air pressure signal, which represents the viscosity of the fluid, enters the bellows 126 from the conduit 46. The bellows 126 expands and by a connection at 150 moves the arm 148 to the right as it moves about the pivot 152. The movement of the arm 148 at 156 is transmitted to the Marsh Funnel pen 158 and the chart 146 by the linkage system of the rod 154, the pin 157, the arm 155, and the pivot 145. The marking on the chart 146 by the pen 158 would be the apparent viscosity of the fluid. However, the Marsh Funnel reading is the apparent viscosity of the fluid modified by its density. Therefore, the movement of the density arm 128 is applied to the viscosity system in order to apply the density effect and obtain the Marsh Funnel reading.

Consequently, the density effect, as represented by the movement of the arm 128, is applied to the linkage of the viscosity system, so that the movement of the pen 158 is modified thereby with the net result being that a Marsh Funnel reading is recorded on the chart 146. This is accomplished by the linkage connecting the arm 128 at 129 to the arm 148 at 153. As the point 129 moves to the left, the linkage rod 166 moves the ratio arm 162 to the left about the pivot 164. This in turn shifts the position of the pivot 153. This causes the arm 148 to then pivot about the point 150 and readjusts the movement of the pen 158. Thus, the density effect is applied to the viscosity system and the Marsh Funnel reading is obtained. Once the density effect is applied and remains constant, the arm 148 will pivot about 153. However, as the density changes, the pivot point of the arm 148 will move to 150 so that the density effect is automatically and continuously applied.

It is apparent that the density measurement and recordation is indepedent of the viscosity system. Whereas, the viscosity system is modified by the density in order to obtain the Marsh Funnel readings which are desired in the oil drilling industry.

In order to transmite Marsh Funnel readings to a remote gauge, the linkage rod 172, which is connected to the Marsh Funnel pen 158 at 174, actuates the flapper 192. Air enters conduit 182 from air supply 180 and through restriction 186. The air also enters conduit 188 which leads to nozzle 190. The normal position of bellows 176 is compressed and in this position causes flapper 192 to be pulled in, sealing nozzle 190. With nozzle 190 sealed, the air pressure is backed up in bellows 176 through conduit 184 so as to cause bellows 176 to expand. Bellows 176 is connected to flapper 192 by a pivot 193, thereby transmitting the expansion of bellows 176 to the flapper 192. This tends to pivot the flapper arm 191 about the pin 178 and causes the flapper 192 to move away from nozzle 190. The uncovering of nozzle 190 by flapper 192 allows the air pressure now backed up in the bellows 176 to bleed out through nozzle 190, thereby causing bellows 176 to collapse until the flapper 192 is restricting the passage of air through the nozzle 190, thereby a null balance is achieved and the air pressure in the bellows 176 is transmitted through conduit 184 to a remote gauge (not shown) which is calibrated to read Marsh Funnel proportional to the air signal from conduit 184.

Although the invention has been described in terms of specific embodiments, it should be understood that this was by way of illustration only and that the invention is not limited thereto. Accordingly, modifications of the invention are contemplated without departing from the spirit of the described invention or the scope of the appended claims.

We claim:

1. An arrangement for continuously indicating the Marsh Funnel readings of a flowing fluid, such as a drilling fluid or cement slurry, comprising in combination: a container for the fluid; a circuit conduit system including a constant velocity pump and a density loop incorporated therein; a source of air under pressure; first converter means connected to said density loop and to said source of air for deriving an air signal proportional to the density of fluid in said density loop; a second converter connected to said source of air and said conduit system for deriving an air signal proportional to the apparent viscosity of said fluid; means for translating said air signals into mechanical movements; and means combining said mechanical movements to provide a continuous indication of the flow properties of the fluid in terms of its viscosity characteristic as modified by its density.

2. The arrangement as defined in claim 1, in which the means for translating said air signals into mechanical movements comprises a pair of bellows, one connected to each of said converters respectively, and indicator means interposed in linkage between said bellows to provide said continuous indication.

References Cited in the file of this patent

UNITED STATES PATENTS

| | | |
|---|---|---|
| 1,963,011 | Albersheim et al. | June 12, 1934 |
| 2,068,663 | Diehl | Jan. 26, 1937 |
| 2,238,758 | Thornhill | Apr. 15, 1941 |
| 2,252,014 | Lupfer | Aug. 12, 1941 |
| 2,672,151 | Newbold | Mar. 16, 1954 |

OTHER REFERENCES

Instrument Practice, page 447, May 1954 (published by United Trade Press, Ltd.), vol. 8, No. 5.